US012700417B2

(12) United States Patent
Yang et al.

(10) Patent No.: US 12,700,417 B2
(45) Date of Patent: Aug. 4, 2026

(54) ELECTRONIC DEVICE FOR OUTPUTTING SOUND AND OPERATING METHOD THEREOF

(71) Applicant: SAMSUNG ELECTRONICS CO., LTD., Suwon-si (KR)

(72) Inventors: Jaemo Yang, Suwon-si (KR); Sangeun Kim, Suwon-si (KR); Hangil Moon, Suwon-si (KR); Soonho Baek, Suwon-si (KR); Gunwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 18/593,442

(22) Filed: Mar. 1, 2024

(65) Prior Publication Data

US 2024/0203437 A1 Jun. 20, 2024

Related U.S. Application Data

(63) Continuation of application No. PCT/KR2022/013224, filed on Sep. 2, 2022.

(30) Foreign Application Priority Data

Sep. 2, 2021 (KR) ........................ 10-2021-0117183

(51) Int. Cl.
*H04B 3/20* (2006.01)
*G10L 21/0208* (2013.01)
*H04R 1/08* (2006.01)

(52) U.S. Cl.
CPC ............ *G10L 21/0208* (2013.01); *H04R 1/08* (2013.01); *H04R 1/083* (2013.01); *G10L 2021/02082* (2013.01)

(58) Field of Classification Search
CPC ........ H04R 25/606; H04R 1/08; H04R 1/083; H04R 3/02; H04R 25/45; H04R 2499/11;
(Continued)

(56) References Cited

U.S. PATENT DOCUMENTS

| | | | | |
|---|---|---|---|---|
| 6,173,058 | B1 * | 1/2001 | Takada | H04M 9/082 381/151 |
| 9,847,093 | B2 | 12/2017 | Lee et al. | |

(Continued)

FOREIGN PATENT DOCUMENTS

| | | | |
|---|---|---|---|
| CN | 109195042 | A | 1/2019 |
| CN | 109391870 | A | 2/2019 |

(Continued)

OTHER PUBLICATIONS

Cordourier Maruri et al., "V-Speech: Noise-Robust Speech Capturing Glasses Using Vibration Sensors", Proceedings of the ACM on Interactive Mobile Wearable and Ubiquitous Technologies, Dec. 1, 2018, 23 total pages, vol. 2, doi:10.1145/3287058.

(Continued)

*Primary Examiner* — Md S Elahee
(74) *Attorney, Agent, or Firm* — Sughrue Mion, PLLC

(57) ABSTRACT

An electronic device includes a vibration sensor; a microphone; memory storing at least one instruction; and at least one processor, wherein the at least one processor is configured to execute the at least one instruction to: receive, via the microphone, a speech signal including reverberation uttered by a user, receive, via the vibration sensor, a vibration signal related to the speech signal, transmitted through at least a portion of a body of the user, predict reverberation information based on the speech signal and the vibration signal, and eliminate the reverberation included in the speech signal based on the predicted reverberation information.

18 Claims, 12 Drawing Sheets

(58) Field of Classification Search
CPC ....... G10L 21/0208; G10L 2021/02082; H04S 7/305; G01H 7/00; H04M 9/082
USPC ........................................................ 381/66
See application file for complete search history.

(56) References Cited

U.S. PATENT DOCUMENTS

| | | | | |
|---|---|---|---|---|
| 10,425,733 | B1 | 9/2019 | Choisel et al. | |
| 2009/0268932 | A1* | 10/2009 | Abolfathi ............. | H04R 25/606 381/151 |
| 2012/0276961 | A1 | 11/2012 | Momma | |
| 2014/0093093 | A1 | 4/2014 | Dusan et al. | |
| 2014/0126729 | A1 | 5/2014 | Heiman et al. | |
| 2015/0133097 | A1 | 5/2015 | Jang | |
| 2015/0341722 | A1 | 11/2015 | Iyengar et al. | |
| 2019/0035415 | A1* | 1/2019 | Lu ....................... | G10L 21/0208 |
| 2020/0258539 | A1 | 8/2020 | Shim et al. | |

FOREIGN PATENT DOCUMENTS

| | | | |
|---|---|---|---|
| EP | 1684442 | A1 | 7/2006 |
| JP | 2002-125298 | A | 4/2002 |
| JP | 4607015 | B2 | 1/2011 |
| KR | 10-2016-0149961 | A | 12/2016 |
| KR | 10-2045953 | B1 | 11/2019 |

OTHER PUBLICATIONS

Wada et al., "Enhancement of Residual Echo for Robust Acoustic Echo Cancellation", IEEE Transactions on Audio, Speech, and Language Processing, Jan. 1, 2012, pp. 175-189, vol. 20, doi:10.1109/TASL.2011.2159592.
Communication dated Aug. 29, 2025, issued by Korean Intellectual Property Office in Korean Patent Application No. 10-2021-0117183.
K. Lebart et al., "A New Method Based on Spectral Subtraction for Speech Dereverberation", Acta Acustica, vol. 87, May 2001, pp. 359-366.
International Search Report (PCT/ISA/210) issued by the International Searching Authority on Dec. 12, 2022 in International Application No. PCT/KR2022/013224.
Written Opinion (PCT/ISA/237) issued by the International Searching Authority on Dec. 12, 2022 in International Application No. PCT/KR2022/013224.

* cited by examiner

ELECTRONIC DEVICE FOR OUTPUTTING SOUND AND OPERATING METHOD THEREOF

CROSS-REFERENCE TO RELATED APPLICATIONS

This application is a continuation of International Application No. PCT/KR2022/013224 designating the United States, filed on Sep. 2, 2022, in the Korean Intellectual Property Receiving Office, which claims priority to Korean Patent Application No. 10-2021-0117183 filed on Sep. 2, 2021, in the Korean Intellectual Property Office, the contents of which are incorporated by reference herein in their entireties.

BACKGROUND

1. Field

The disclosure relates to an electronic device for outputting sound and a method of operating the same.

2. Description of Related Art

Along with the development of wireless communication technology, an electronic device may communicate with another electronic device by various wireless communication technologies. Bluetooth communication technology refers to a short-range wireless communication technology that allows electronic devices to connect to each other and exchange data or information between them. Further, the Bluetooth communication technology may include Bluetooth legacy (or classic) network technology or Bluetooth low energy (BLE) networks, and have different topologies of connectivity, such as piconet and scatternet. Electronic devices may share data with each other at low power using the Bluetooth communication technology. This Bluetooth technology may be used to connect external wireless communication devices, transmit audio data of content executed on an electronic device to an external wireless communication device, and process the audio data in the external wireless communication device, for output to a user. In recent years, wireless earphones using the Bluetooth communication technology have been widely used. Further, wireless earphones with a plurality of microphones are widely used to improve the performance of the wireless earphones.

Wireless earphones based on true wireless stereo (TWS) may use a microphone included in them to obtain a user's speech. However, because the microphone in the wireless earphones is physically separated from the user's mouth, the user's speech may be corrupted by reverberation and ambient noise.

In recent wireless earphones, a beamforming signal processing technique using a plurality of microphones is applied to obtain a good quality speech. In this case, the wireless earphones are designed to maximize the distance between the plurality of microphones and place the microphones close to the user's mouth. However, the beamforming signal processing technique is mainly aimed at cancelling ambient noise and may not be effective in eliminating reverberation from the user's speech.

SUMMARY

Provided are an electronic device and a method of operating the same, which may predict reverberation in a user's speech obtained through a microphone, and eliminate the reverberation included in the user's speech using predicted reverberation information.

According to an aspect of the disclosure, an electronic device includes: a vibration sensor; a microphone; memory storing at least one instruction; and at least one processor, wherein the at least one processor is configured to execute the at least one instruction to: receive, via the microphone, a speech signal including reverberation uttered by a user, receive, via the vibration sensor, a vibration signal related to the speech signal, transmitted through at least a portion of a body of the user, predict reverberation information based on the speech signal and the vibration signal, and eliminate the reverberation included in the speech signal based on the predicted reverberation information.

The at least one processor is may be configured to execute the at least one instruction to: identify an impulse response signal between the speech signal and the vibration signal, and predict the reverberation information based on the impulse response signal.

The reverberation information may include at least one of a reverberation time of the impulse response signal or an early-to-late reverberation ratio between early reverberation and late reverberation included in the speech signal.

The reverberation time may be a time taken for the impulse response signal based on the speech signal and the vibration signal to be reduced by a specified strength.

The at least one processor may be further configured to execute the at least one instruction to: identify a strength of each of early reverberation and late reverberation included in the speech signal based on the reverberation information, and eliminate the reverberation included in the speech signal by subtracting the strength of the late reverberation from a strength of the speech signal.

The at least one processor may be further configured to execute the at least one instruction to: identify a noise strength of the speech signal, and based on the noise strength being not greater than a first value, eliminate the reverberation included in the speech signal.

The at least one processor may be further configured to execute the at least one instruction to: identify a strength of the reverberation included in the speech signal, and based on the strength of the reverberation of the speech signal being greater than a second value, eliminate the reverberation included in the speech signal.

The at least one processor may be further configured to execute the at least one instruction to, based on the strength of the reverberation of the speech signal being not greater than the second value, cancel noise included in the speech signal without eliminating the reverberation included in the speech signal.

The at least one processor may be further configured to execute the at least one instruction to, based on the noise strength being greater than the first value, cancel noise included in the speech signal without eliminating the reverberation included in the speech signal.

The at least one processor may be further configured to execute the at least one instruction to determine an amount of the reverberation included in the speech signal to be eliminated, based on the noise strength.

According to an aspect of the disclosure, a method of operating an electronic device, includes: receiving, via a microphone of the electronic device, a speech signal including reverberation uttered by a user; receiving, via a vibration sensor included in the electronic device, a vibration signal related to the speech signal, transmitted through at least a portion of a body of the user; predicting reverberation information based on the speech signal and the vibration signal; and eliminating the reverberation included in the speech signal based on the predicted reverberation information.

The predicting the reverberation information may include: identifying an impulse response signal between the speech signal and the vibration signal; and predicting the reverberation information based on the impulse response signal.

The reverberation information may include at least one of a reverberation time of the impulse response signal or an early-to-late reverberation ratio between early reverberation and late reverberation included in the speech signal.

The reverberation time may be a time taken for the impulse response signal based on the speech signal and the vibration signal to be reduced by a specified strength.

The eliminating the reverberation may include: identifying a strength of each of early reverberation and late reverberation included in the speech signal using the reverberation information; and eliminating the reverberation included in the speech signal by subtracting the strength of the late reverberation from a strength of the speech signal.

The eliminating the reverberation may include: identifying a noise strength of the speech signal; and based on the noise strength being not greater than a first value, eliminating the reverberation included in the speech signal.

The eliminating the reverberation may further include: identifying a strength of the reverberation included in the speech signal; and based on the strength of the reverberation of the speech signal being greater than a second value, eliminating the reverberation included in the speech signal.

The method may further include, based on the strength of the reverberation of the speech signal being not greater than the second value, canceling noise included in the speech signal without eliminating the reverberation included in the speech signal.

The method may further include, based on the noise strength being greater than the first value, canceling noise included in the speech signal without eliminating the reverberation included in the speech signal.

According to an aspect of the disclosure, a non-transitory computer-readable recording medium stores one or more instructions which, when executed by a processor of an electronic device, cause the electronic device to execute a method including: receiving, via a microphone of the electronic device, a speech signal including reverberation uttered by a user; receiving, via a vibration sensor of the electronic device, a vibration signal related to the speech signal, transmitted through at least a portion of a body of the user; predicting reverberation information based on the speech signal and the vibration signal; and eliminating the reverberation included in the speech signal based on the predicted reverberation information.

BRIEF DESCRIPTION OF THE DRAWINGS

The above and other aspects, features, and advantages of certain embodiments of the present disclosure are more apparent from the following description taken in conjunction with the accompanying drawings, in which.

DETAILED DESCRIPTION

Figure 1:
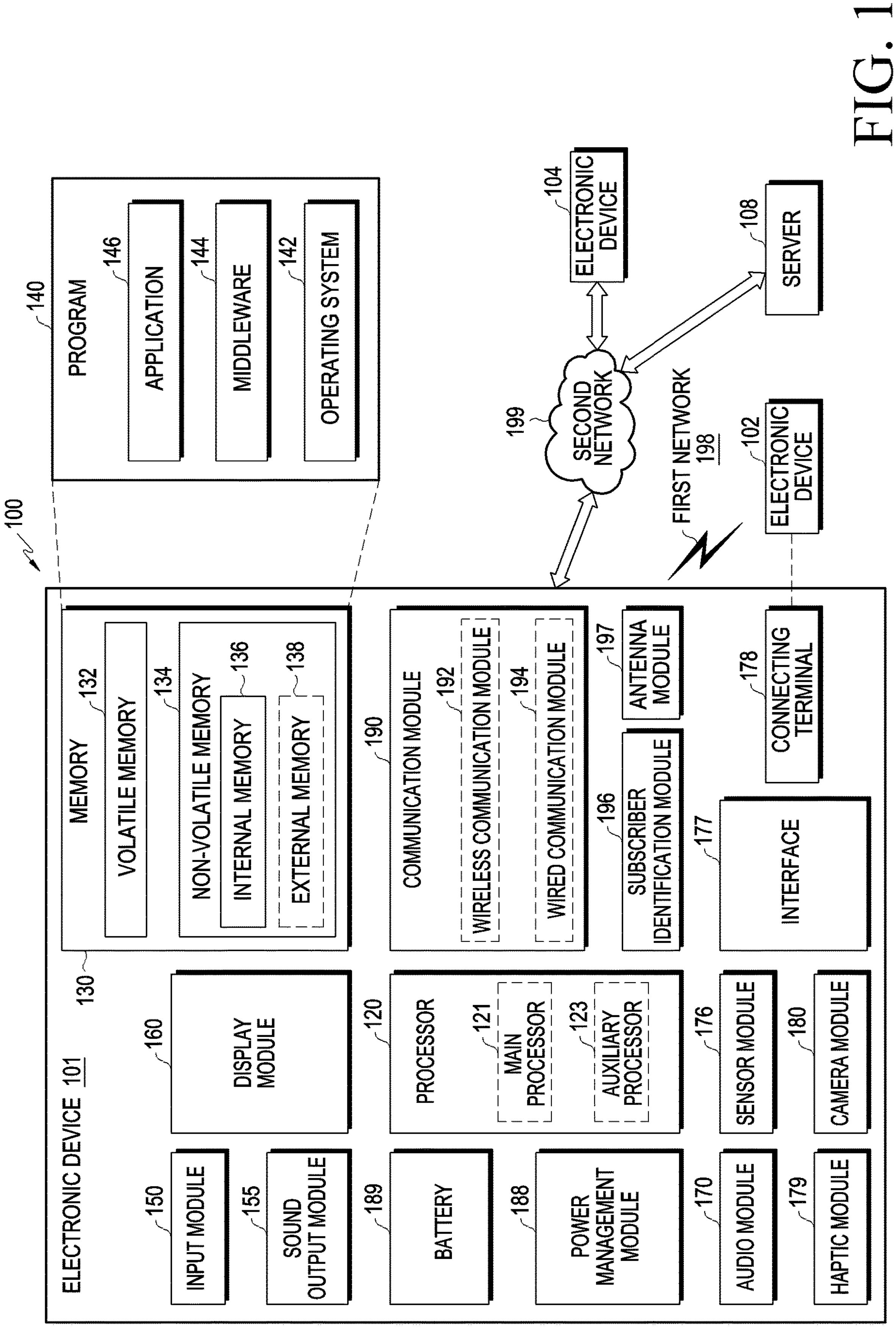
FIG. 1 is a block diagram of an electronic device in a network environment according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one or more embodiments, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one or more embodiments, the haptic module 179 may include, for example, a motor, a piezoelectric element, or an electric stimulator.

The camera module 180 may capture a still image or moving images. According to one or more embodiments, the camera module 180 may include one or more lenses, image sensors, image signal processors, or flashes.

The power management module 188 may manage power supplied to the electronic device 101. According to one or more embodiments, the power management module 188 may be implemented as at least part of, for example, a power management integrated circuit (PMIC).

The battery 189 may supply power to at least one component of the electronic device 101. According to one or more embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one or more embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna.

The wireless communication module 192 may support various requirements specified in the electronic device 101, an external electronic device (e.g., the electronic device 104), or a network system (e.g., the second network 199). According to one or more embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one or more embodiments, the antenna module 197 may include an antenna including a radiating element composed of a conductive material or a conductive pattern formed in or on a substrate (e.g., a printed circuit board (PCB)). According to one or more embodiments, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to one or more embodiments, another component (e.g., a radio frequency integrated circuit (RFIC)) other than the radiating element may be additionally formed as part of the antenna module 197.

According to one or more embodiments, the antenna module 197 may form an mmWave antenna module. According to one or more embodiments, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to one or more embodiments, all or some of operations to be executed at the electronic device 101 may be executed at one or more of the external electronic devices 102, 104, or 108. For example, if the electronic device 101 may perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In one or more embodiments, the external electronic device 104 may include an Internet of things (IoT) device. The server 108 may be an intelligent server using machine learning and/or a neural network.

According to one or more embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to one or more embodiments of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “$1^{st}$” and “$2^{nd}$”, or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to one or more embodiments, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

Figure 2A:
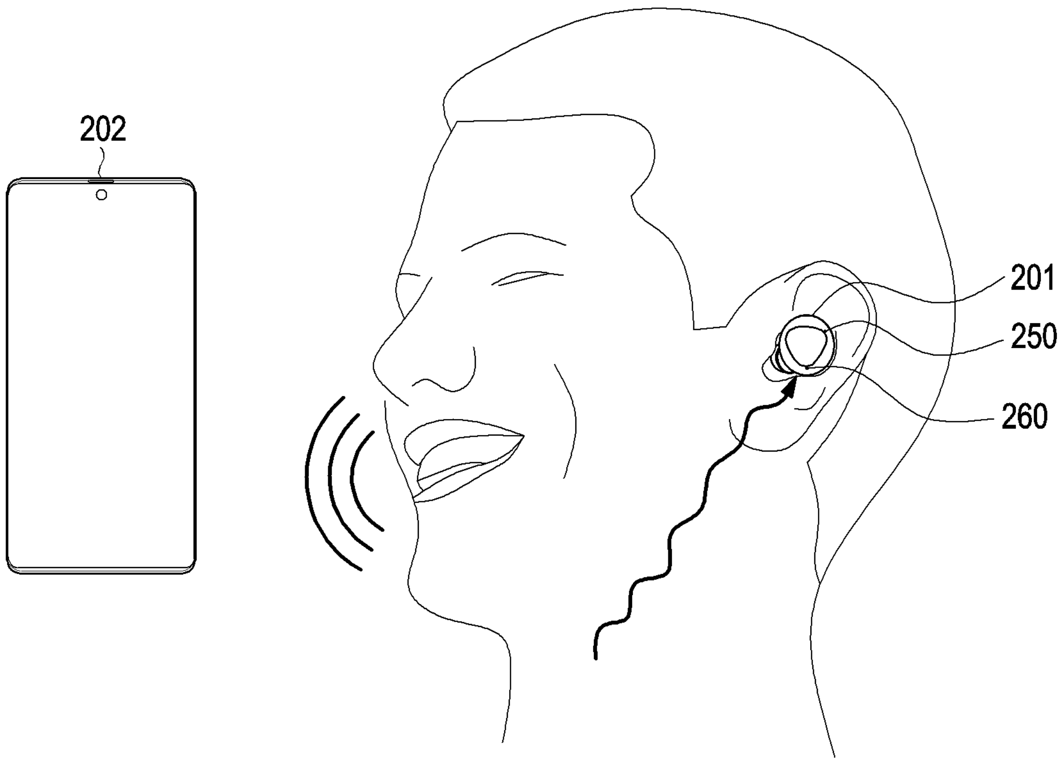
FIG. 2A is a diagram illustrating an electronic system according to one or more embodiments.

FIG. 2A is a diagram illustrating an electronic system according to one or more embodiments.

Referring to FIG. 2A, according to one or more embodiments, an electronic device 201 may be implemented to be identical or similar to the electronic device 101 in FIG. 1. The electronic device 201 may be implemented in a form wearable on the right or left ear of a user. For example, the electronic device 201 may be implemented as an earphone that wirelessly outputs sound. For example, the electronic device 201 may be implemented as a wireless earphone based on true wireless stereo (TWS).

According to one or more embodiments, the electronic device 201 may establish a communication link (e.g., a communication link using the Bluetooth communication technology) with an external electronic device 202 (e.g., the electronic device 102 or 104 in FIG. 1). The electronic device 201 may transmit and receive sound-related data to and from the external electronic device 202 via the communication link. For example, the external electronic device 202 may be implemented as a smartphone.

Figure 2B:
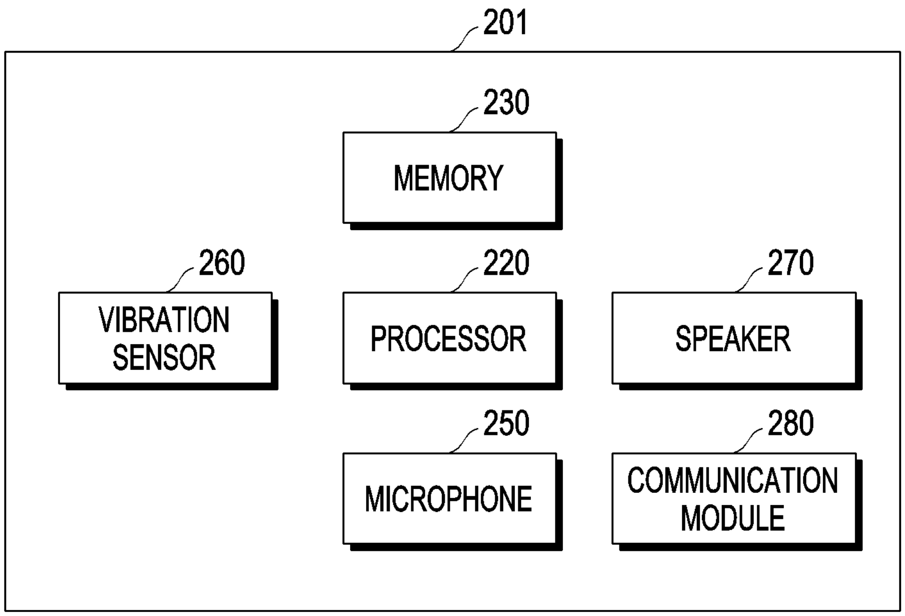
FIG. 2B is a block diagram illustrating an electronic device according to one or more embodiments.

According to one or more embodiments, the electronic device 201 may convert data received from the external electronic device 202 into sound and output the converted sound (e.g., audio, music, ambient sound, or phone call sound) via a speaker (e.g., a speaker 270 in FIG. 2B). The electronic device 201 may obtain external sound (e.g., a user’s speech or ambient sound) via a microphone 250 and transmit data corresponding to the obtained sound to the external electronic device 202. For example, the electronic device 201 may perform operations for noise cancellation and reverberation elimination on the sound obtained via the microphone 250. Further, the electronic device 201 may transmit data corresponding to the sound on which the noise cancellation and reverberation elimination have been performed to the external electronic device 202.

According to one or more embodiments, while worn on the user's ear, the electronic device 101 may receive a speech signal uttered by the user via the microphone. Further, the electronic device 101 may receive, via a vibration sensor 260, a vibration signal corresponding to vibrations (e.g., vocal cord vibrations) caused by the user's utterance. For example, the vibration signal may be transmitted by at least a portion of the user's body. For example, the speech signal may include reverberation generated by reflections from a space around the user. The vibration signal may include no or little reverberation.

According to one or more embodiments, the electronic device 201 may eliminate reverberation included in the speech signal based on the speech signal and the vibration signal. The operation of eliminating reverberation included in the speech signal by the electronic device 201 will be described in more detail below.

FIG. 2B is a block diagram illustrating an electronic device according to one or more embodiments.

Referring to FIG. 2B, the electronic device 201 may include a processor 220, memory 230, the microphone 250, the vibration sensor 260, the speaker 270, and a communication module 280.

According to one or more embodiments, the processor 220 may provide overall control to the operations of the electronic device 201. The processor 220 may be implemented to be identical or similar to the processor 120 in FIG. 1.

According to one or more embodiments, the processor 220 may receive, via the microphone 250, a speech signal including reverberation uttered by the user. For example, a first microphone 250 may refer to a microphone connected to an outer hole, while the electronic device 201 is worn on the user's ear. In FIG. 2B, the electronic device 201 is shown as including a single microphone 250, which does not limit the technical ideas of the disclosure. For example, the electronic device 201 may include a plurality of microphones. Further, the processor 220 may receive speech signals including reverberation uttered by the user from the plurality of microphones.

According to one or more embodiments, the processor 220 may receive, via the vibration sensor 260, a vibration signal related to a speech signal transmitted through at least a portion of the user's body. For example, the vibration signal may be generated by vibrations of the user's vocal cords, based on a speech being uttered by the user. For example, the vibration sensor 260 may include an acceleration sensor, an in-ear microphone, and/or a bone conduction microphone.

According to one or more embodiments, the processor 220 may predict reverberation information based on the speech signal and the vibration signal from the user's utterance. For example, the reverberation information may include a reverberation time of a transfer function (e.g., an impulse response) between the speech signal corresponding to the speech input to the microphone 250 and the vibration signal corresponding to the vibrations input to the vibration sensor 260, and/or an early-to-late reverberation ratio between early reverberation and late reverberation included in the reverberation information. For example, the reverberation time may mean a time taken for an impulse response signal to be reduced by a specified strength (e.g., 60 dB).

According to one or more embodiments, the processor 220 may eliminate the reverberation included in the speech signal based on the predicted reverberation information. For example, the processor 220 may identify the strength or power of each of the early reverberation and late reverberation included in the speech signal, using the reverberation information. The processor 220 may eliminate the reverberation included in the speech signal by subtracting the strength or power of the late reverberation from the strength or power of the speech signal.

According to one or more embodiments, the processor 220 may output the reverberation-eliminated speech signal via the speaker 270 (e.g., the sound output module 155 in FIG. 1). Alternatively, the processor 220 may transmit audio data corresponding to the reverberation-eliminated speech signal to the external electronic device 201 via the communication module 280 (e.g., the communication module 190 in FIG. 1). According to one or more embodiments, the processor 220 may store the audio data corresponding to the reverberation-eliminated speech signal in the memory 230 (e.g., the memory 130 in FIG. 1).

According to one or more embodiments, the electronic device 201 may be implemented as a first-direction earphone (e.g., an earphone worn on the left ear). The electronic device 201 may be paired with a second-direction earphone (e.g., an earphone worn on the right ear). While for ease of description, only the electronic device 201 is described herein, the technical features of the electronic device 201 may be equally applicable to the second-direction earphone.

Operations of the electronic device 201 described below may be controlled by the processor 220. For ease of description, the electronic device 201 is described as performing the following operations. However, the technical features of one or more embodiments may be performed by the second-direction earphone paired with the electronic device 201.

Figure 3:
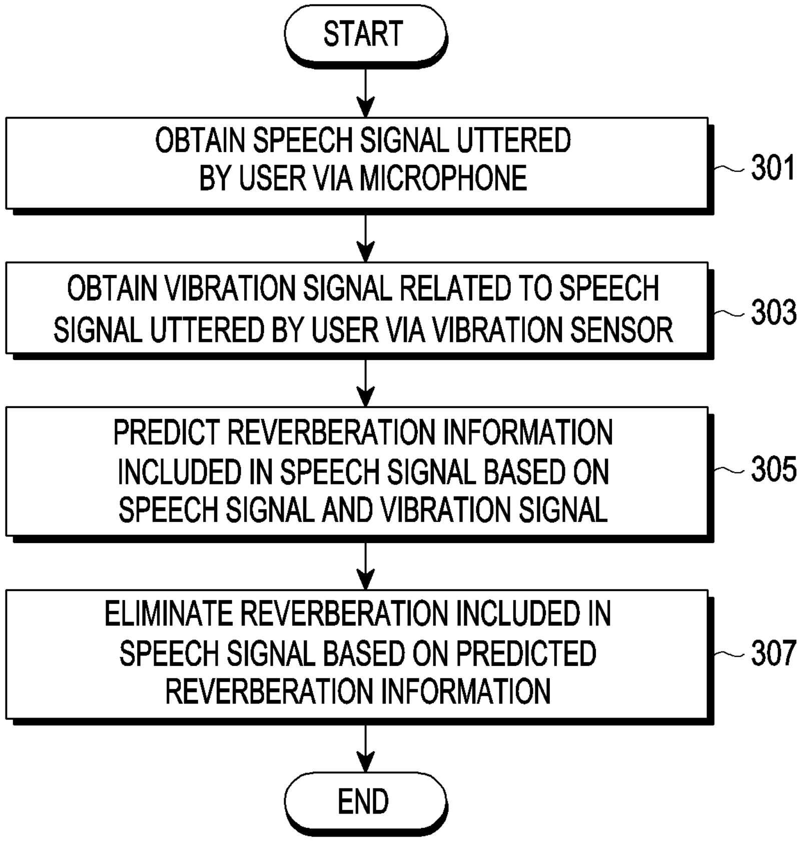
FIG. 3 is a flowchart illustrating an operation of eliminating reverberation from a speech signal in an electronic device according to one or more embodiments.

FIG. 3 is a flowchart illustrating an operation of eliminating reverberation from a speech signal in an electronic device according to one or more embodiments.

Referring to FIG. 3, according to one or more embodiments, the electronic device 201 may obtain a speech signal uttered by the user via the microphone 250 in operation 301. For example, based on the electronic device 201 including a plurality of microphones, the electronic device 201 may obtain a plurality of speech signals from the plurality of microphones. In this case, the electronic device 201 may use a signal that is averaged over the plurality of speech signals to predict reverberation information. Alternatively, the electronic device 201 may use any one of the plurality of speech signals to predict the reverberation information. For example, $x(t)$ representing the speech signal obtained via the microphone 250 may be $s(t)*h(t)$. Herein, $s(t)$ may be the speech signal uttered by the user, and $h(t)$ may be a room impulse response.

According to one or more embodiments, in operation 303, the electronic device 201 may obtain a vibration signal via the vibration sensor 260. For example, $y(t)$ representing the vibration signal obtained via the vibration sensor 260 may be $s(t)*i(t)$. Herein, $s(t)$ may be the vibration signal from the user's utterance, and $i(t)$ may be a function of a transfer path from the user's vocal cords to the vibration sensor 260.

According to one or more embodiments, in operation 305, the electronic device 201 may predict reverberation information included in the speech signal based on the speech signal and the vibration signal. For example, the electronic device 201 may identify an impulse response (h(t), hereinafter referred to as an IR response) between the speech signal and the vibration signal. For example, the electronic device 201 may obtain the IR response (e.g., h(t)) using a normalized least mean square (NLMS) algorithm. The electronic device 201 may predict or identify the reverberation information included in the speech signal based on the IR response. For example, the reverberation information may include a reverberation time of the IR response and an early-to-late reverberation ratio.

According to one or more embodiments, in operation 307, the electronic device 201 may eliminate the reverberation included in the speech signal based on the predicted reverberation information. For example, the electronic device 201 may identify the strength (or power) of late reverberation based on the reverberation time. The electronic device 201 may eliminate the reverberation included in the speech signal by subtracting the strength (or power) of the late reverberation from the strength (or power) of the speech signal.

Figure 4:
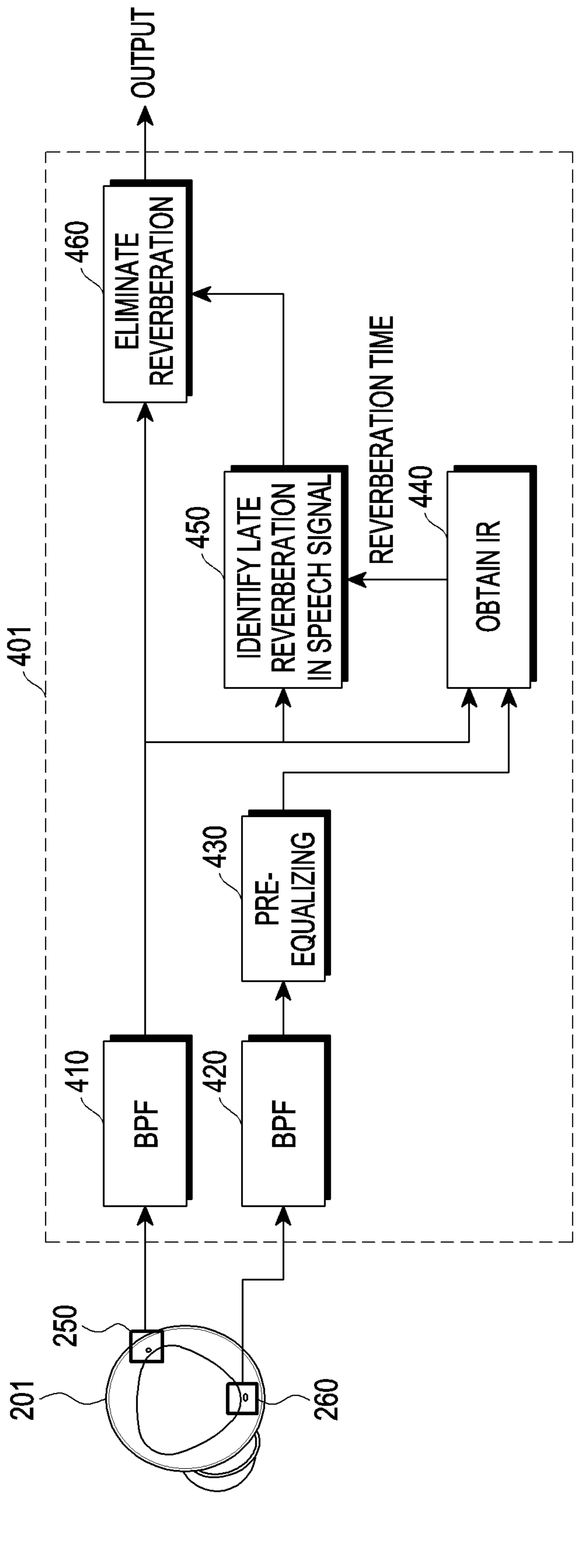
FIG. 4 is a diagram illustrating an operation of eliminating reverberation from a speech signal in an electronic device according to one or more embodiments.

FIG. 4 is a diagram illustrating an operation of eliminating reverberation from a speech signal in an electronic device according to one or more embodiments.

Referring to FIG. 4, according to one or more embodiments, the electronic device 201 may perform a reverberation elimination operation 401 to eliminate reverberation included in a speech signal. For example, the reverberation elimination operation 401 may be performed by the processor 220.

According to one or more embodiments, the electronic device 201 may filter a speech signal corresponding to a speech received via the microphone 250 by a band pass filter (BPF) in operation 410. For example, the electronic device 201 may filter the speech signal to a specified frequency band by the BPF. According to one or more embodiments, the electronic device 201 may also filter the speech signal corresponding to the speech received via the microphone 250 by a low pass filter (LPF) or a high pass filter (HPF).

According to one or more embodiments, in operation 420, the electronic device 201 may filter a vibration signal corresponding to vibrations received via the vibration sensor 260 by a BPF. For example, the electronic device 201 may filter the vibration signal to a specified frequency band by the BPF. According to one or more embodiments, the electronic device 201 may also filter the vibration signal corresponding to the speech received via the vibration sensor 260 by an LPF or a HPF.

According to one or more embodiments, in operation 430, the electronic device 201 may perform pre-equalization on the vibration signal filtered by the BPF. For example, the vibration signal may have different characteristics from the speech signal. Accordingly, the electronic device 201 may perform pre-equalization to equalize the vibration signal to match the characteristics of the speech signal.

According to one or more embodiments, in operation 440, the electronic device 201 may obtain or predict an IR signal based on the speech signal and the pre-equalized vibration signal. For example, the electronic device 201 may obtain an IR signal between the speech signal and the pre-equalized vibration signal through an NLMS adaptive filter. Further, the electronic device 201 may identify a reverberation time based on the IR signal. For example, the electronic device 201 may determine the reverberation time (e.g., $RT_{60}$) as a time taken to reduce an energy magnitude by 60 dB with respect to a root mean square (RMS) graph of the IR signal.

According to one or more embodiments, in operation 450, the electronic device 201 may identify late reverberation (or a late reverberation component) in the speech signal based on the reverberation time. For example, the electronic device 201 may identify an early reverberation component and a late reverberation component included in the speech signal based on the RMS graph of the IR signal.

In operation 460, according to one or more embodiments, the electronic device 201 may eliminate the reverberation included in the speech signal by subtracting the strength (or power) of the late reverberation component from the strength (or power) of the speech signal. The electronic device 201 may output the reverberation-eliminated speech signal. For example, the electronic device 201 may output the reverberation-eliminated speech signal via the speaker 270. Alternatively, the electronic device 201 may transmit data corresponding to the reverberation-eliminated speech signal to the external electronic device 202.

Figure 5:
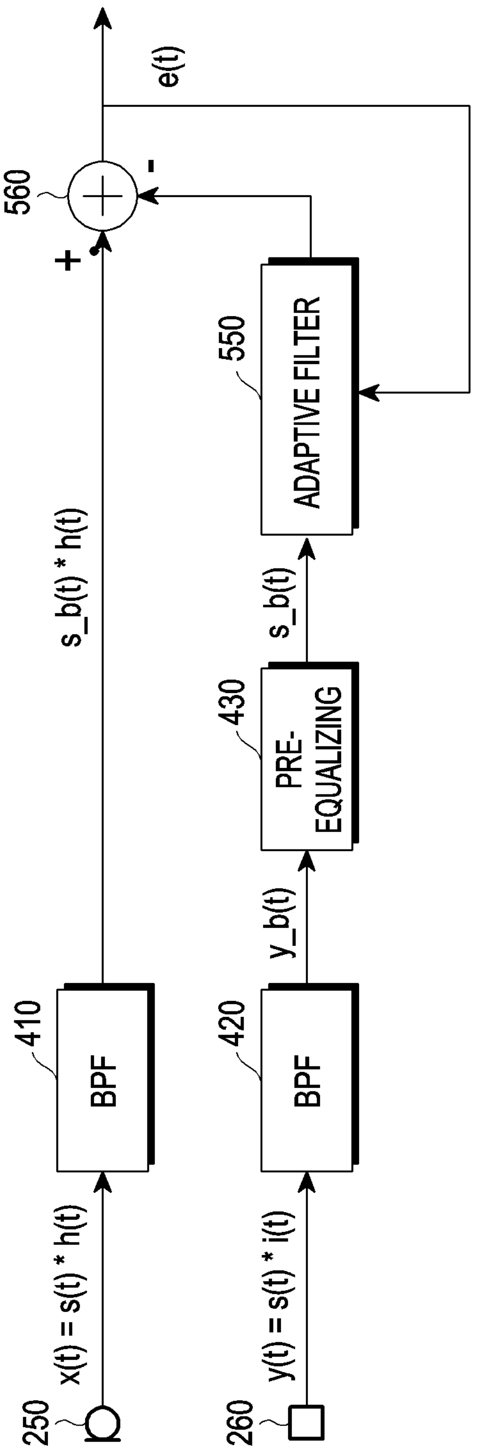
FIG. 5 is a diagram illustrating an operation of obtaining an impulse response based on a speech signal and a vibration signal in an electronic device according to one or more embodiments.

FIG. 5 is a diagram illustrating an operation of obtaining an impulse response based on a speech signal and a vibration signal in an electronic device according to one or more embodiments.

Referring to FIG. 5, according to one or more embodiments, the electronic device 201 may filter a speech signal (e.g., x(t)=s(t)*h(t)) corresponding to a speech received via the microphone 250 by the BPF in operation 410. For example, the signal filtered by the BPF may be s_b(t)*h(t).

According to one or more embodiments, in operation 420, the electronic device 201 may filter a vibration signal (e.g., y(t)=s(t)*i(t)) corresponding to a vibration received via the vibration sensor 260 by the BPF (e.g., output y_b(t)).

According to one or more embodiments, in operation 430, the electronic device 201 may perform pre-equalization on the vibration signal (e.g., y_b(t)) filtered by the BPF. A path transfer function component i(t) included in the filtered vibration signal (e.g., y_b(t)) may be eliminated by the pre-equalization. For example, the signal filtered by the BPF and pre-equalized may be s_b(t).

According to one or more embodiments, in operation 550, the electronic device 201 may estimate an IR signal through an adaptive filter. For example, the adaptive filter may be implemented as an NLMS adaptive filter. In operation 560, the electronic device 201 may output an error signal e(t) by subtracting the magnitude of a signal output through the adaptive filter from the power of the speech signal filtered by the BPF. The electronic device 201 may predict (or identify) an IR signal between the speech signal and the vibration signal by controlling the error signal e(t) to be zero or to converge to zero.

Figure 6:
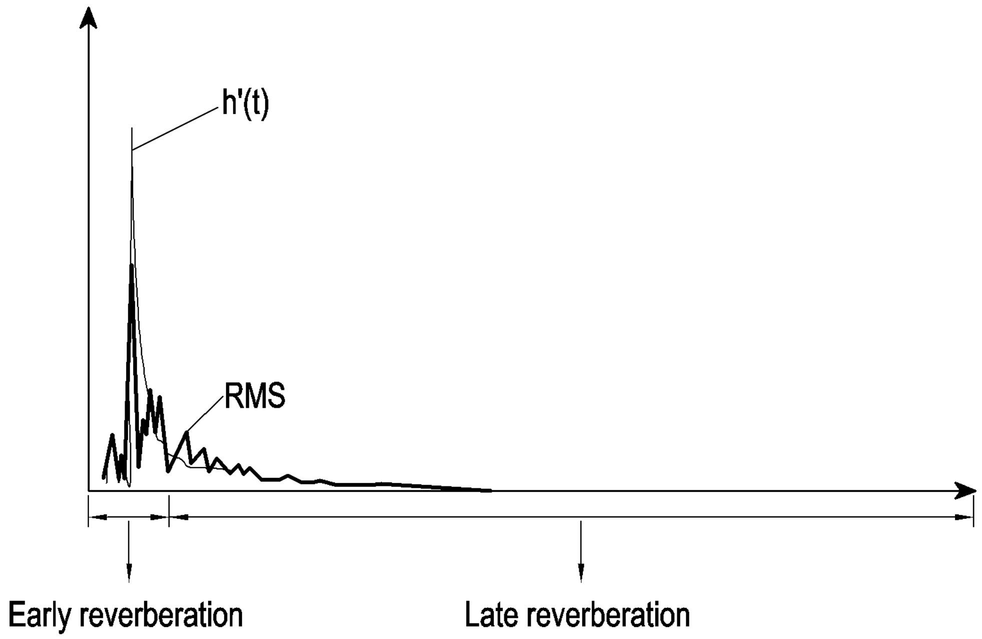
FIG. 6 is a diagram illustrating an operation of obtaining reverberation information based on an impulse response in an electronic device according to one or more embodiments.

According to one or more embodiments, the adaptive filter may be efficiently implemented on the frequency axis using fast Fourier transform (FFT). The electronic device 201 may efficiently predict the IR signal h(t) on the frequency axis using an adaptive filter in which an NLMS adaptive filter and an FFT filter are combined. In FIG. 6 below, the predicted IR signal will be defined as h'(t).

FIG. 6 is a diagram illustrating an operation of obtaining reverberation information based on an impulse response in an electronic device according to one or more embodiments.

Referring to FIG. 6, according to one or more embodiments, the electronic device 201 may predict (or identify) the IR signal h'(t) through an adaptive filter 550 (e.g., an NLMS adaptive filter). The electronic device 201 may identify the RMS of the IR signal h'(t).

According to one or more embodiments, the electronic device 201 may identify a reverberation time based on the RMS of the IR signal h'(t). For example, the reverberation time may be a time (e.g., $RT_{60}$ in seconds) for the strength of the RMS to decrease by a specified level (e.g., 60 dB). However, the value of the specified level may be changed by the user or the processor.

According to one or more embodiments, the IR signal h'(t) may include an early reverberation component and a late reverberation component. For example, the early reverberation (or early reverberation component) may refer to a reflected sound (or reverberation) introduced into the microphone by reflection of original sound from a surrounding space before a specified time (e.g., 15 msec). The late reverberation (or late reverberation component) may refer to a reflected sound (or reverberation) introduced into the microphone by reflection of the original sound from the surrounding space after the specified time. For example, the late reverberation (or late reverberation component) may cause reverberation of the speech signal.

According to one or more embodiments, the electronic device 201 may eliminate the reverberation of the speech signal by subtracting the late reverberation or late reverberation component from the speech signal.

Figure 7:
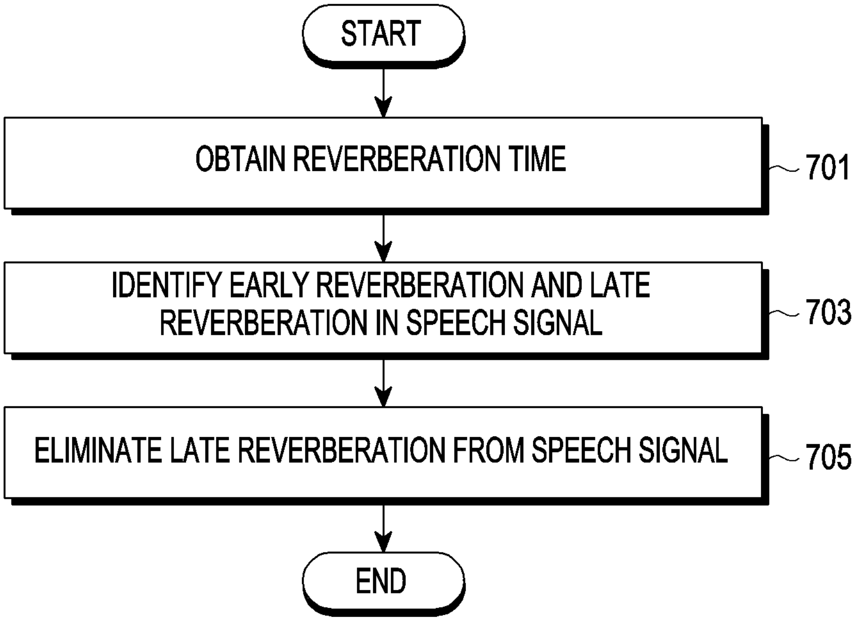
FIG. 7 is a flowchart illustrating an operation of eliminating reverberation included in a speech signal using a reverberation time in an electronic device according to one or more embodiments.

FIG. 7 is a flowchart illustrating an operation of eliminating reverberation included in a speech signal using a reverberation time in an electronic device according to one or more embodiments.

Referring to FIG. 7, according to one or more embodiments, the electronic device 201 may obtain (or predict) a reverberation time $RT_{60}$ based on a predicted IR signal between a speech signal and a vibration signal in operation 701. The electronic device 201 may identify h(t) by applying the reverberation time $RT_{60}$ to the "Polack's model" of Equation 1.

$$h(t) = \begin{cases} b(t)e^{-\bar{\delta}t}, & t > 0 \\ 0, & \text{otherwise} \end{cases} \quad \text{[Equation 1]}$$

$$b(t)\text{: zero-mean white Gaussian noise}$$

$$\bar{\delta} = \frac{3 \ln 10}{RT_{60}}$$

According to one or more embodiments, the electronic device 201 may identify early reverberation and late reverberation in the IR signal h(t) in operation 703. For example, the electronic device 201 may separate the obtained IR signal h(t) into an early reverberation component h_e(t) and a late reverberation component h_l(t) through the Pollock model of Equation 1. For example, h(t)=h_e(t)+h_l(t). For example, a threshold for distinguishing between the early reverberation and the late reverberation may be 50 ms for a speech. For example, the threshold for distinguishing between early reverberation and late reverberation may be 80 ms for music.

According to one or more embodiments, the electronic device 201 may separate a speech signal x(t) input to the microphone 250 into an early reverberation component x_e(t) and a late reverberation component x_l(t). For example, the electronic device 201 may eliminate reverberation by a technique called spectral subtraction, in which the power of x_l(t) is subtracted from the power of x(t), because the Pollock model establishes that x_e(t) and x_l(t) are uncorrelated. Herein, the electronic device 201 may identify the power of x_l(t) using Equation 2 (e.g., a power spectral density (PSD)).

$$\lambda_{x_l}(l, k) = E\{|X_l(l, k)|^2\} \quad \text{[Equation 2]}$$

According to one or more embodiments, the electronic device 201 may identify the strength (or power) of the late reverberation using Equation 3. For example, the electronic device 201 may distinguish $\lambda_{x_e}$(l, k) representing the strength (or power) of the early reverberation from $\Lambda_{x_l}$(l, k) representing the strength (or power) of the late reverberation in $\lambda_x$(l, k) representing the strength (or power) of the IR signal (e.g., h(t) in Equation 1). Accordingly, the electronic device 201 may identify $\lambda_{x_l}$(l, k) representing the strength (or power) of the late reverberation. For example, the electronic device 201 may identify (or predict) the strength (or power) of the late reverberation by reflecting the reverberation time t in $e^{-2\bar{\delta}T_1}\lambda_x(1-N_1, k)$. For example, $N_1$ may indicate the number of frames, $T_1$ may be 50 msec, and $f_s$ may indicate a sampling frequency, which may be 8 kHz or 16 kHz.

$$\lambda_x(l, k) = \lambda_{x_e}(l, k) + \lambda_{x_l}(l, k) \quad \text{[Equation 3]}$$

$$\lambda_{x_l}(l, k) = e^{-2\bar{\delta}T_1}\lambda_x(1 - N_1, k)$$

$$N_1 = T_1 f_s/\text{frame Rate}$$

According to one or more embodiments, in operation 705, the electronic device 201 may eliminate the late reverberation from the speech signal. For example, the electronic device 201 may subtract the strength (or power) of the late reverberation from the strength (or power) of the speech signal by spectral subtraction. For example, the electronic device 201 may eliminate the reverberation by spectral subtraction, a technique that subtracts the power of x_l(t) from the power of x(t), because the Pollock model establishes that x_e(t) and x_l(t) are uncorrelated. This allows the electronic device 201 to eliminate the reverberation included in the speech signal.

Figure 8:
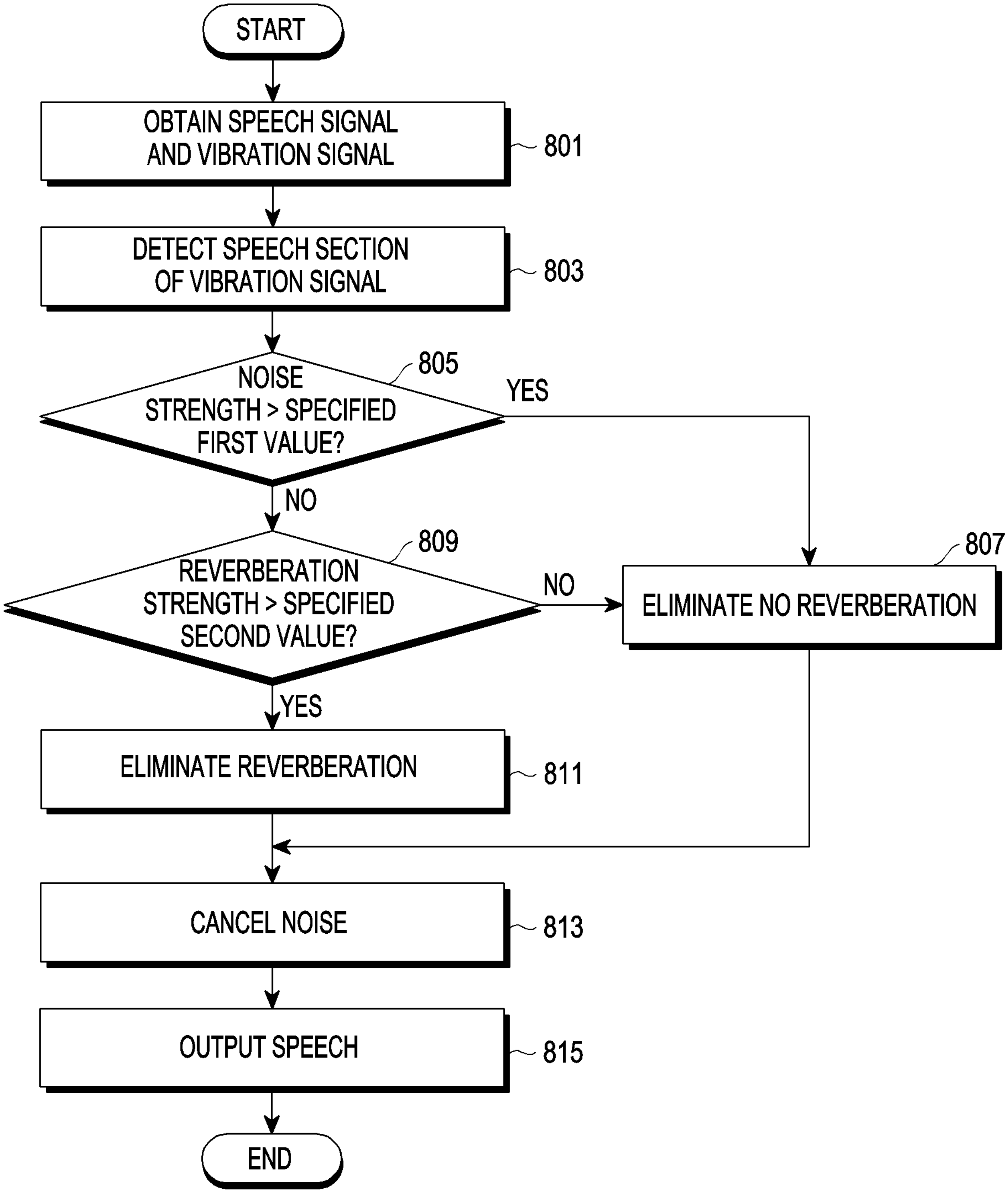
FIG. 8 is a flowchart illustrating an operation of eliminating reverberation from a speech signal based on a noise strength in an electronic device according to one or more embodiments.

FIG. 8 is a flowchart illustrating an operation of eliminating reverberation from a speech signal based on a noise strength in an electronic device according to one or more embodiments.

Referring to FIG. 8, according to one or more embodiments, the electronic device 201 may obtain a speech signal and a vibration signal (via the microphone and the vibration sensor), based on a speech being uttered by the user in operation 801.

In operation 803, according to one or more embodiments, the electronic device 201 may detect a speech section of the vibration signal. For example, the electronic device 201 may perform a voice activity detection (VAD) operation to detect the speech section of the vibration signal. For example, the electronic device 201 may detect the speech section of the vibration signal by pre-equalizing.

According to one or more embodiments, the electronic device 201 may determine a noise strength of the speech signal. For example, the electronic device 201 may identify whether the noise strength is greater than a specified first value in operation 805. For example, the specified first value may be a value indicative of a noise strength allowing the reverberation of the speech signal to be negligible. For example, the specified first value may be a value representative of a noise strength with an SNR of 0 dB or less. For example, the specified first value may be determined by the user or automatically determined by the processor 220.

According to one or more embodiments, based on the noise strength being greater than the specified first value (yes in operation 805), the electronic device 201 may not eliminate the reverberation included in the speech signal in operation 807.

According to one or more embodiments, based on the noise strength being not greater than the specified first value (no in operation 805), the electronic device 201 may identify whether a reverberation strength is greater than a specified second value in operation 809. For example, the reverberation strength may refer to the strength (or power) of late reverberation included in an IR signal. For example, the specified second value may be a value indicative of a reverberation strength allowing the reverberation of the speech signal to be negligible. For example, the specified second value may be determined by the user or automatically determined by the processor 220.

According to one or more embodiments, based on the reverberation strength being not greater than the specified second value (no in operation 809), the electronic device 201 may not eliminate the reverberation included in the speech signal in operation 807.

According to one or more embodiments, based on the reverberation strength being greater than the specified second value (yes in operation 809), the electronic device 201 may eliminate the reverberation included in the speech signal in operation 811. For example, the electronic device 201 may eliminate the reverberation included in the speech signal by subtracting the strength (or power) of the late reverberation from the strength (or power) of the speech signal. According to one or more embodiments, the electronic device 201 may determine an amount of the reverberation to be eliminated in the speech signal based on the noise strength. For example, based on the noise strength being relatively large (e.g., less than the specified first value and greater than a specified third value), the reverberation component may tend to be canceled by the noise, thereby reducing the amount of the reverberation to be eliminated. For example, the electronic device 201 may reflect a weight (e.g., the weight may be greater than zero and less than one) in the strength of the late reverberation subtracted from the strength of the speech signal.

According to one or more embodiments, the electronic device 201 may eliminate noise included in the speech signal in operation 813.

According to one or more embodiments, in operation 815, the electronic device 201 may output a speech corresponding to the speech signal after eliminating the noise. For example, the electronic device 201 may output the speech through the speaker 270. Alternatively, the electronic device 201 may transmit data corresponding to the speech signal to the external electronic device 202 via the communication module 280. In this case, the external electronic device 202 may output the speech corresponding to the speech signal through a speaker included in the external electronic device 202. Alternatively, the external electronic device 202 may transmit data corresponding to the speech signal to an electronic device of the other party communicating with the external electronic device 202.

Figure 9:
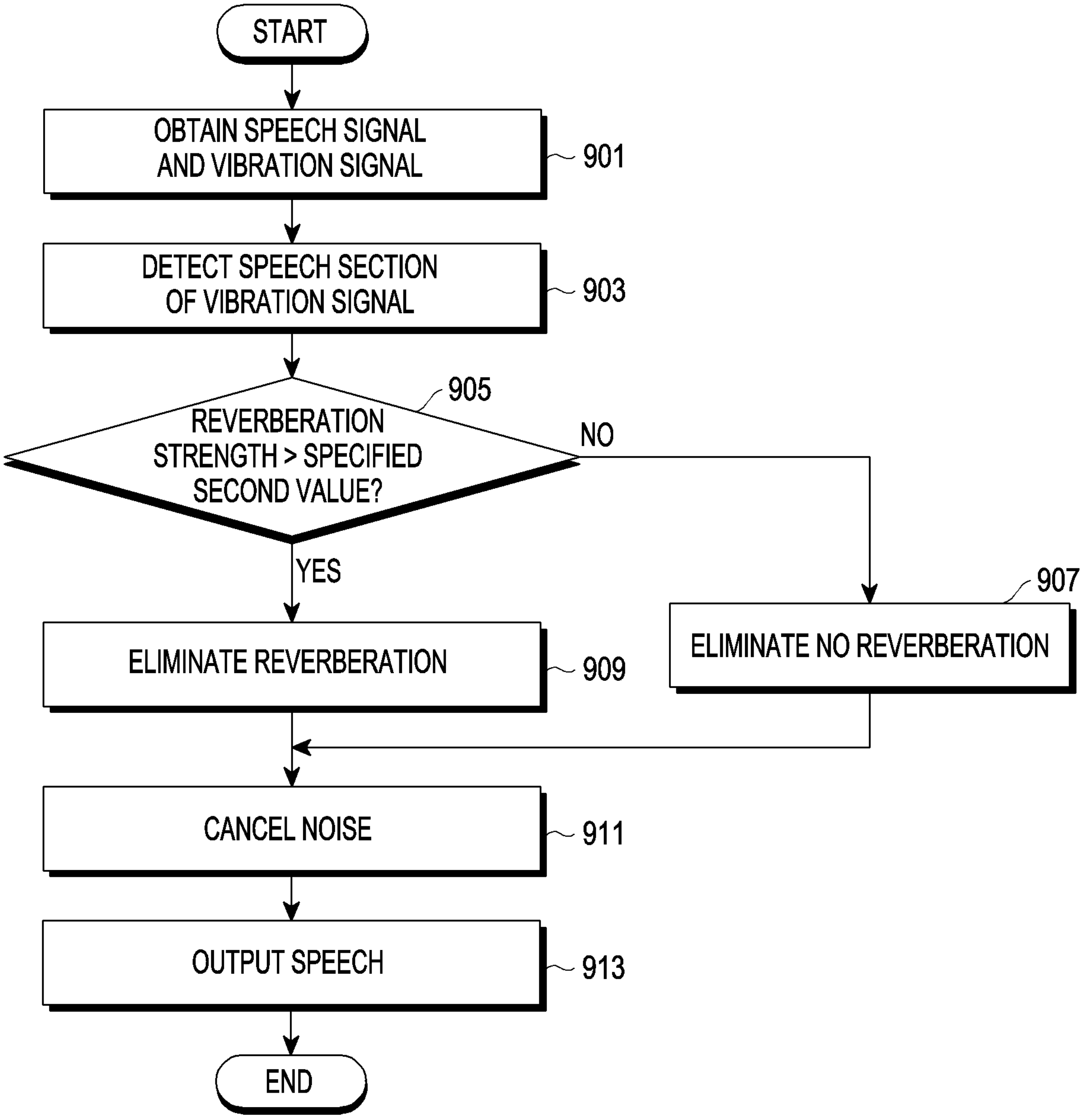
FIG. 9 is a flowchart illustrating an operation of eliminating reverberation from a speech signal based on a reverberation strength in an electronic device according to one or more embodiments.

FIG. 9 is a flowchart illustrating an operation of eliminating reverberation from a speech signal based on a reverberation strength in an electronic device according to one or more embodiments.

Referring to FIG. 9, according to one or more embodiments, the electronic device 201 may obtain a speech signal and a vibration signal (via the microphone and the vibration sensor), based on a speech being uttered by the user in operation 901.

According to one or more embodiments, in operation 903, the electronic device 201 may detect a speech section of the vibration signal. For example, the electronic device 201 may perform a VAD operation to detect the speech section of the vibration signal. For example, the electronic device 201 may detect the speech section of the vibration signal by pre-equalization.

According to one or more embodiments, the electronic device 201 may identify a reverberation strength of the speech signal. For example, the electronic device 201 may identify whether the reverberation strength is greater than a specified second value in operation 905. For example, the reverberation strength may refer to the strength (or power) of late reverberation included in an IR signal.

According to one or more embodiments, based on the noise strength being not greater than the specified second value (no in operation 905), the electronic device 201 may not eliminate reverberation included in the speech signal in operation 907.

According to one or more embodiments, based on the reverberation strength being greater than the specified second value (yes in operation 905), the electronic device 201 may eliminate the reverberation included in the speech signal in operation 909. For example, the electronic device 201 may eliminate the reverberation included in the speech signal by subtracting the strength (or power) of late reverberation from the strength (or power) of the speech signal.

According to one or more embodiments, the electronic device 201 may eliminate noise included in the speech signal in operation 911.

According to one or more embodiments, the electronic device 201 may output a speech corresponding to the speech signal after eliminating the noise in operation 913. For example, the electronic device 201 may output the speech through the speaker 270. Alternatively, the electronic device 201 may transmit data corresponding to the speech signal to the external electronic device 202 via the communication module 280. In this case, the external electronic device 202 may output the speech corresponding to the speech signal through the speaker included in the external electronic device 202. Alternatively, the external electronic device 202 may transmit data corresponding to the speech signal to an electronic device of the other party communicating with the external electronic device 202.

Figure 10A:
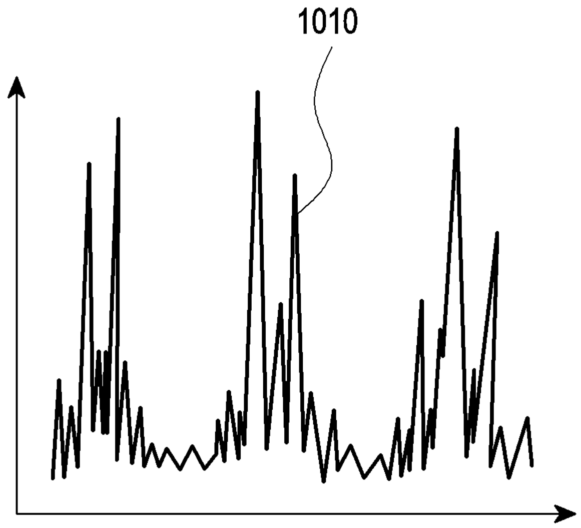
FIG. 10A, FIG. 10B, and FIG. 10C are diagrams illustrating an operation of eliminating reverberation included in a speech signal in an electronic device according to one or more embodiments.
Figure 10B:
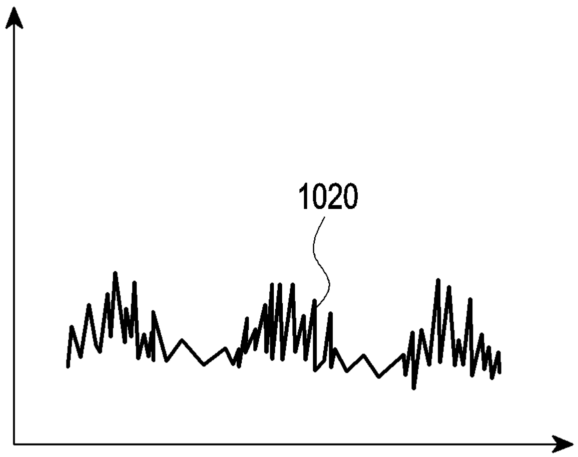
Figure 10C:
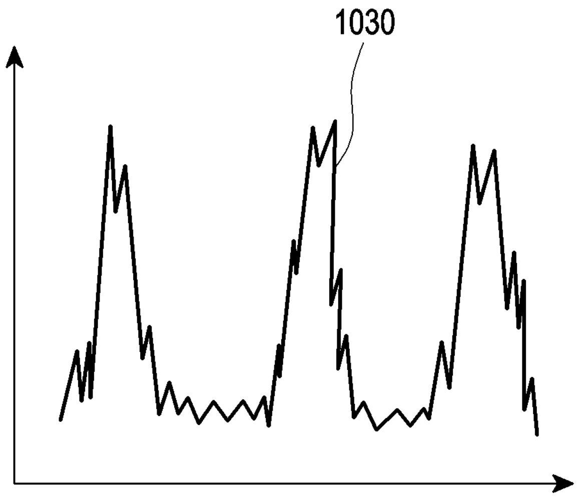

FIGS. 10A to 10C are diagrams illustrating an operation of eliminating reverberation included in a speech signal in an electronic device according to one or more embodiments.

Referring to FIG. 10A, the electronic device 201 may obtain, via the microphone 250, a speech signal 1010 corresponding to a speech generated by the user's utterance in a space. For example, the speech signal 1010 may include reverberation (or a reverberation component) reflected from the space. For example, as the space changes, the shape of the speech signal may change.

Referring to FIG. 10B, the electronic device 201 may obtain, via the vibration sensor 260, a vibration signal 1020 corresponding to the speech generated by the user's utterance in the space. For example, the vibration signal 1020 may include no or little reverberation (or reverberation component) reflected from the space. For example, the shape of the speech signal may not change significantly even if the space changes.

Referring to FIG. 10C, the electronic device 201 may eliminate reverberation included in speech signal 1010 based on the speech signal 1010 and the vibration signal 1020. The electronic device 201 may obtain a signal 1030 obtained by eliminating the reverberation from the speech signal 1010.

According to one or more embodiments, the reverberation-eliminated signal 1030 may be used for an application for voice calls and/or speech recognition. Accordingly, the electronic device 201 may improve the quality of the user's speech in a reverberation environment.

The electronic device 201 according to one or more embodiments may include the vibration sensor 260, the microphone 220, and the processor 220. The processor may be configured to receive, via the microphone, a speech signal including reverberation uttered by a user, receive, via the vibration sensor, a vibration signal, transmitted through at least a portion of the user's body, predict reverberation information based on the speech signal and the vibration signal, and eliminate the reverberation included in the speech signal based on the predicted reverberation information.

The processor may be configured to identify an impulse response signal between the speech signal and the vibration signal, and predict the reverberation information based on the impulse response signal.

The reverberation information may include a reverberation time of the impulse response and/or an early-to-late reverberation ratio between early reverberation and late reverberation included in the speech signal.

The reverberation time may be a time taken for the impulse response signal based on the speech signal and the vibration signal to be reduced by a specified strength.

The processor may be configured to identify a strength of each of early reverberation and late reverberation included in the speech signal using the reverberation information, and eliminate the reverberation included in the speech signal by subtracting the strength of the late reverberation from a strength of the speech signal.

The processor may be configured to identify a noise strength of the speech signal, and based on the noise strength being not greater than a specified value, eliminate the reverberation included in the speech signal.

The processor may be configured to identify a strength of the reverberation included in the speech signal, and based on the strength of the reverberation being greater than a specified value, eliminate the reverberation included in the speech signal.

The processor may be configured to, based on the strength of the reverberation being not greater than the specified value, cancel noise included in the speech signal without eliminating the reverberation included in the speech signal.

The processor may be configured to, based on the noise strength being greater than the specified value, cancel noise included in the speech signal without eliminating the reverberation included in the speech signal.

The processor may be configured to determine an amount of the reverberation included in the speech signal, to be eliminated, based on the nose strength.

A method of operating the electronic device 201 according to one or more embodiments may include receiving, via the microphone 250 included in the electronic device, a speech signal including reverberation uttered by a user, receiving, via the vibration sensor 260 included in the electronic device, a vibration signal, transmitted through at least a portion of the user's body, predicting reverberation information based on the speech signal and the vibration signal, and eliminating the reverberation included in the speech signal based on the predicted reverberation information.

Predicting the reverberation information may include identifying an impulse response signal between the speech signal and the vibration signal, and predicting the reverberation information based on the impulse response signal.

The reverberation information may include a reverberation time of the impulse response and/or an early-to-late reverberation ratio between early reverberation and late reverberation included in the speech signal.

The reverberation time may be a time taken for the impulse response signal based on the speech signal and the vibration signal to be reduced by a specified strength.

Eliminating the reverberation may include identifying a strength of each of early reverberation and late reverberation included in the speech signal using the reverberation information, and eliminating the reverberation included in the speech signal by subtracting the strength of the late reverberation from a strength of the speech signal.

Eliminating the reverberation may include identifying a noise strength of the speech signal, and based on the noise strength being not greater than a specified value, eliminating the reverberation included in the speech signal.

Eliminating the reverberation may include identifying a strength of the reverberation included in the speech signal, and based on the strength of the reverberation being greater than a specified value, eliminating the reverberation included in the speech signal.

The method may further include, based on the strength of the reverberation being not greater than the specified value, canceling noise included in the speech signal without eliminating the reverberation included in the speech signal.

The method may further include, based on the noise strength being greater than the specified value, canceling noise included in the speech signal without eliminating the reverberation included in the speech signal.

A non-transitory recording medium according to one or more embodiments may store a program capable of executing receiving, via a microphone included in an electronic device, a speech signal including reverberation uttered by a user, receiving, via a vibration sensor included in the electronic device, a vibration signal, transmitted through at least a portion of the user's body, predicting reverberation information based on the speech signal and the vibration signal, and eliminating the reverberation included in the speech signal based on the predicted reverberation information.

What is claimed is:

1. An electronic device comprising:
a vibration sensor;
a microphone;
memory storing at least one instruction; and
at least one processor,
wherein the at least one instruction, when executed by the at least one processor individually or collectively, cause the electronic device to:
receive, via the microphone, a speech signal including reverberation uttered by a user wearing the electronic device,
receive, via the vibration sensor, a vibration signal related to the speech signal, the vibration signal being sensed through at least a portion of a body of the user when the speech signal is uttered by the user,
identify an impulse response signal based on the speech signal and the vibration signal,
predict reverberation information based on the impulse response signal, and
eliminate the reverberation included in the speech signal based on the predicted reverberation information.

2. The electronic device of claim 1, wherein the reverberation information includes at least one of a reverberation time of the impulse response signal or an early-to-late reverberation ratio between early reverberation and late reverberation included in the speech signal.

3. The electronic device of claim 2, wherein the reverberation time is a time taken for the impulse response signal based on the speech signal and the vibration signal to be reduced by a specified strength.

4. The electronic device of claim 1, wherein the at least one instruction, when executed by the at least one processor individually or collectively, further cause the electronic device to:

identify a strength of each of early reverberation and late reverberation included in the speech signal based on the reverberation information, and eliminate the reverberation included in the speech signal by subtracting the strength of the late reverberation from a strength of the speech signal.

5. The electronic device of claim 1, wherein the at least one instruction, when executed by the at least one processor individually or collectively, further cause the electronic device to:

identify a noise strength of the speech signal, and based on the noise strength being not greater than a first value, eliminate the reverberation included in the speech signal.

6. The electronic device of claim 5, wherein the at least one instruction, when executed by the at least one processor individually or collectively, further cause the electronic device to:

identify a strength of the reverberation included in the speech signal, and based on the strength of the reverberation included in the speech signal being greater than a second value, eliminate the reverberation included in the speech signal.

7. The electronic device of claim 6, wherein the at least one instruction, when executed by the at least one processor individually or collectively, further cause the electronic device to, based on the strength of the reverberation included in of the speech signal being not greater than the second value, cancel noise included in the speech signal without eliminating the reverberation included in the speech signal.

8. The electronic device of claim 5, wherein the at least one instruction, when executed by the at least one processor individually or collectively, further cause the electronic device to, based on the noise strength being greater than the first value, cancel noise included in the speech signal without eliminating the reverberation included in the speech signal.

9. The electronic device of claim 5, wherein the at least one instruction, when executed by the at least one processor individually or collectively, further cause the electronic device to determine an amount of the reverberation included in the speech signal to be eliminated, based on the noise strength.

10. A method of operating an electronic device, the method comprising:

receiving, via a microphone of the electronic device, a speech signal including reverberation uttered by a user wearing the electronic device;

receiving, via a vibration sensor included in the electronic device, a vibration signal related to the speech signal, the vibration signal being sensed through at least a portion of a body of the user when the speech signal is uttered by the user;

identifying an impulse response signal based on the speech signal and the vibration signal;

predicting reverberation information based on the impulse response signal; and eliminating the reverberation included in the speech signal based on the predicted reverberation information.

11. The method of claim 10, wherein the reverberation information includes at least one of a reverberation time of the impulse response signal or an early-to-late reverberation ratio between early reverberation and late reverberation included in the speech signal.

12. The method of claim 11, wherein the reverberation time is a time taken for the impulse response signal based on the speech signal and the vibration signal to be reduced by a specified strength.

13. The method of claim 10, wherein the eliminating the reverberation comprises:

identifying a strength of each of early reverberation and late reverberation included in the speech signal using the reverberation information; and eliminating the reverberation included in the speech signal by subtracting the strength of the late reverberation from a strength of the speech signal.

14. The method of claim 10, wherein the eliminating the reverberation comprises:

identifying a noise strength of the speech signal; and based on the noise strength being not greater than a first value, eliminating the reverberation included in the speech signal.

15. The method of claim 14, wherein the eliminating the reverberation further comprises:

identifying a strength of the reverberation included in the speech signal; and based on the strength of the reverberation included in the speech signal being greater than a second value, eliminating the reverberation included in the speech signal.

16. The method of claim 15, further comprising, based on the strength of the reverberation included in the speech signal being not greater than the second value, canceling noise included in the speech signal without eliminating the reverberation included in the speech signal.

17. The method of claim 14, further comprising, based on the noise strength being greater than the first value, canceling noise included in the speech signal without eliminating the reverberation included in the speech signal.

18. A non-transitory computer-readable recording medium storing one or more instructions which, when executed by a processor of an electronic device, cause the electronic device to execute a method comprising:

receiving, via a microphone of the electronic device, a speech signal including reverberation uttered by a user wearing the electronic device;

receiving, via a vibration sensor of the electronic device, a vibration signal related to the speech signal, the vibration signal being sensed through at least a portion of a body of the user;

identifying an impulse response signal based on the speech signal and the vibration signal;

predicting reverberation information based on the impulse response signal; and eliminating the reverberation included in the speech signal based on the predicted reverberation information.

* * * * *